Mar. 20, 1923.

A. T. SAMPSON 1,449,150

PIPE CUTTING APPARATUS

Filed Aug. 16, 1919   2 sheets-sheet 1

Inventor,
Archibald T. Sampson
by James R. Hodder.
his Attorney

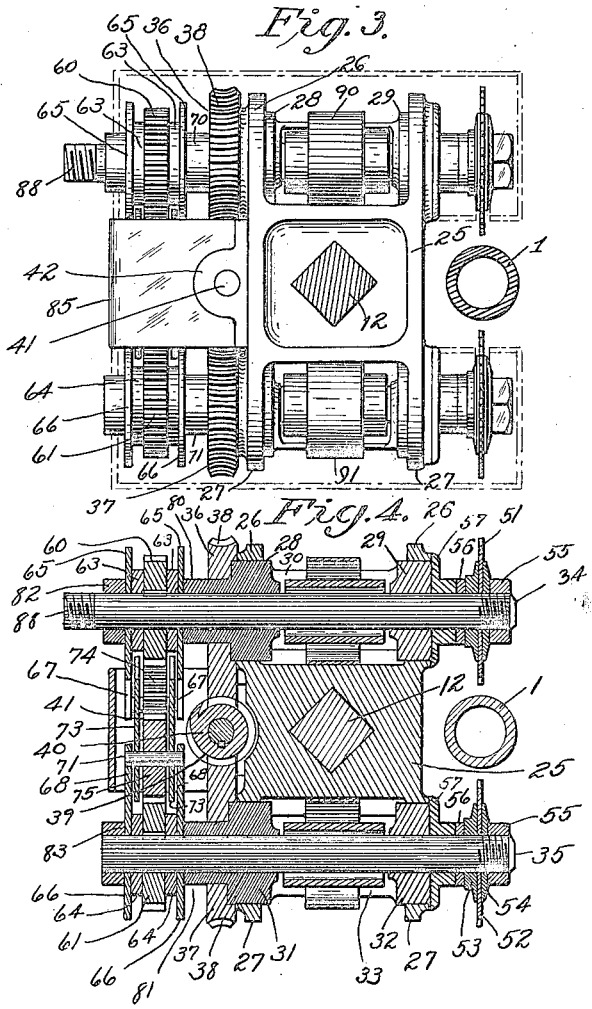

Patented Mar. 20, 1923.

1,449,150

UNITED STATES PATENT OFFICE.

ARCHIBALD T. SAMPSON, OF LYNN, MASSACHUSETTS, ASSIGNOR TO SAMPSON AXCESS SYSTEM, INC., OF LYNN, MASSACHUSETTS, A CORPORATION OF MASSACHUSETTS.

PIPE-CUTTING APPARATUS.

Application filed August 16, 1919. Serial No. 318,036.

*To all whom it may concern:*

Be it known that I, ARCHIBALD T. SAMPSON, a citizen of the United States, and a resident of Lynn, Massachusetts (whose post-office address is No. 434 Union Street, Lynn, Massachusetts), have invented an Improvement in Pipe-Cutting Apparatus, of which the following description, in connection with the accompanying drawings, is a specification, like letters on the drawings representing like parts.

My present invention is an improved cutting apparatus preferably portable and is particularly adapted to cut a slot or opening in a metal pipe or conduit.

In my improved and novel system of electrical construction and installation, partly explained in my prior co-pending application, Serial No. 166,813, filed May 7, 1917, one of the important features consists in the method of cutting partially through a metal conduit without injury to the electric wires therein, and even when the conduit is already in place in a building. The cutting apparatus herein illustrated and claimed, is intended particularly for use in carrying out the step in my improvements of forming a slot in a conduit pipe for an outlet or tap, by partially cutting through the pipe. The cutter herein shown is equally capable of use in cutting slots in metal pipes or conduits, before the same are positioned in a building and more particularly it is designed to be applicable directly to the pipe after it is installed in the building.

Important features of the apparatus consist in novel and efficient means to cut two sides of a slot in parallelism lengthwise of the pipe for a desired distance, suitable adjustable stops being employed, at will, to determine the distance thus cut;—automatic means to control the simultaneous rotation of both cutters or milling tools;—means to hold the cutters in exact alinement and to move the same along in feeding action during cutting;—means to adjust the milling cutters toward and from each other for work on pieces of varying diameters, as well as to adjust the depth of cut as it is desirable not to have the cutters penetrate the interior of the pipe where they might damage the electric wires.

A most important feature of the apparatus consists in the arrangement of yielding means to maintain the various movable elements, particularly the cutters, and the means for feeding them forwardly in firm but yielding engagement with opposite stops. This construction is particularly desirable in work of this kind so as to provide a uniform and smooth cutting action to eliminate the danger of the milling cutters or saws digging in and forming a burr on the inner surface of the pipe, which would be objectionable, as such roughened burr or edges would damage the electric wires led therethrough and the outlet wires led in. A further important feature consists in the provision of means, preferably automatic, which will adjust the cutting apparatus relatively with the pipe to be cut, holding both pipe and cutters rigidly in proper position to cut and form an outlet slot in the pipe. This means includes clamping devices which will be adjustable about prices of different diameters, will provide a firm and suitable bearing thereon and will automatically hold the cutters centered and in alined parallelism with the pipe, merely by forcing of the clamping jaws together. An additional feature is the arrangement whereby the depth of cut is limited and controlled to facilitate the cutting operation. These are most important capabilities in my present invention and render the apparatus automatic on these features. The position and arrangement of the clamping jaws are such that pipes of different diameters are properly positioned for the cutters to operate thereon and to always make a cut of predetermined or standard size.

Other novel combinations of parts, details of constructions and advantages will be hereinafter more fully pointed out and claimed.

Referring to the drawings, illustrating a preferred embodiment of the invention;

Fig. 3 is a view partly in cross section on the line 3—3 of Fig. 1;

Fig. 4 is a view in cross section on the line 4—4 of Fig. 2;

Fig. 5 is an end view, looking from the right of Fig. 1;

Fig. 6 is a detailed view on an enlarged scale showing the action of the pair of cutters in forming an outlet slot on the pipe; and Fig. 7 is a view on the line 7—7 of Fig. 1.

Figure 1:
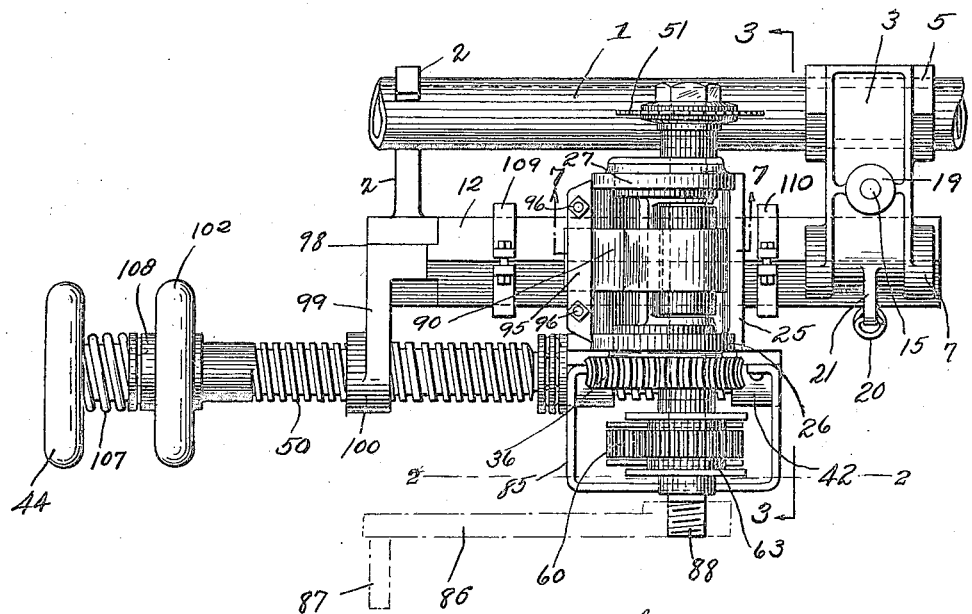
Fig. 1 is a plan view of the cutting apparatus clamped to the pipe.
Figure 2:
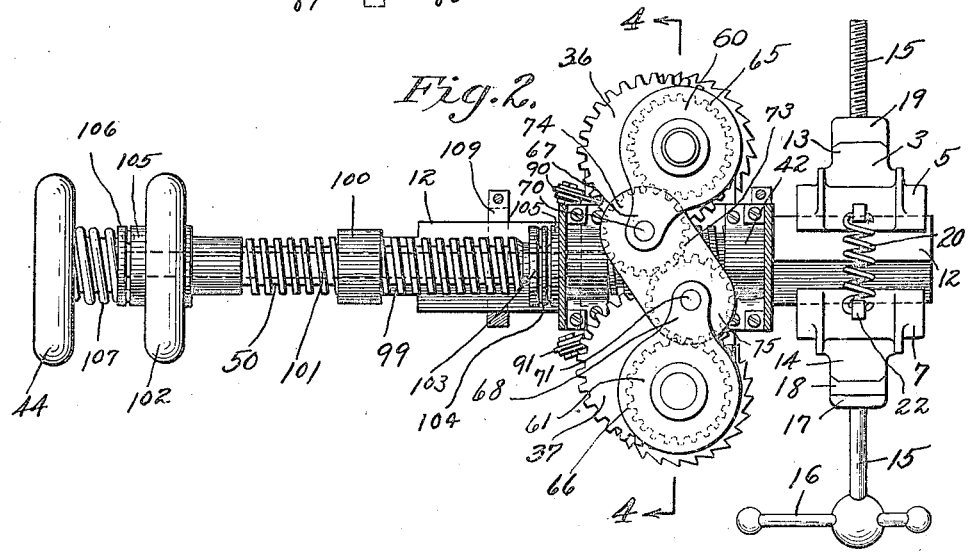
Fig. 2 is a side view with a portion shown in section on the lines 2—2 of Fig. 1.

While the apparatus as shown in the drawings illustrates the cutter as now devised and used, I contemplate providing suitable covers, casings, or housings for the gears and bearings to protect the same from injury, dirt, dust, etc., but I have omitted these housings for the sake of clearness.

As shown in the drawings, the pipe 1 may be positioned in a building or detached, if in a building the pipe may be along the corner at the junction of the ceiling and wall and therefore to enable the cutting apparatus to perform the slotting action on the pipe, I have designed the apparatus to be compact and yet be capable of being applied to such a pipe so positioned, the entire cutting and operating portions of the apparatus being on one side with only the clamping devices encircling the pipe. These clamping devices comprise a hook 2 and a pair of clamping jaws 3 and 4 having pipe engaging angular bearings 5 and 6 respectively and at the opposite sides of the jaws, circular bearing faces 7 and 8 respectively, the latter contacting with similar circular bearings 9 and 10 which are secured to the rigid bar 12 on which the rest of the apparatus and the hook 2 is mounted. To operate the clamps, I form on each jaw, a central boss 13 and 14, as shown, through which a clamping rod 15 passes loosely, having a sliding handle 16 at one end and a collar 17 rigid with the rod 15 and bearing against a washer 18 in contact with the boss 14 on one end. On the opposite end, the rod 15 is threaded and passes through a correspondingly threaded recess in a washer 19 which bears and clamps against the boss 13. Rotation of the handle 16 serves to clamp the jaws firmly together upon the pipe 1 holding the entire cutting apparatus in position and alinement for the sliding operation. In order to also provide a certain self-adjusting or rocking motion for the clamp and to normally separate the jaws when the rotation of the rod 15 permits the same, I provide a spring 20 attached to lugs 21 and 22 on the jaws 3 and 4 respectively near the semi-circular bearings on the rigid bar 12.

Mounted on this bar 12 and arranged for sliding action thereon is the frame 25, said frame having a pair of collars 26, 26 extending from opposite edges of one side and similar collars 27, 27 extending from the other, encircling and holding the hubs 28, 29, 31, and 32, said collars 26 encircling and holding the hubs 28 and 29 to a frame 30 and the collars 27 similarly encircling and holding the hubs 31 and 32 to a frame 33. These frames are rotatable and constitute eccentric mountings or bearings respectively for the saw carrying shafts 34 and 35. This eccentric mounting of the shaft 34 and 35 in the hubs of said frames 30 and 33 allow for adjustment of the saw carrying shafts 34 and 35 and the saws thereon, toward and from each other through the rotation of the frames 30 and 33. To provide for the rotation of such frames and therefore to adjust the saw shafts toward and from each other, I form the hubs 28 and 31 for gear wheels 36 and 37 respectively, these wheels being eccentrically mounted and with their teeth 38, 38, engaging the teeth 39 on a worm 40 keyed to a shaft 41. This shaft 41 has a journaled bearing 42 attached to the frame 25 and extends through a hollow feed shaft 50 to a wheel 44. Rotation of the wheel 44 therefore turns the worm 40 and oscillates the frames 30 and 33 which through the eccentric mounting thereon, moves the shafts 34 and 35 carrying saws toward or from each other.

Secured to each shaft 34 and 35 are the milling cutters or saws 51 and 52 respectively, each being firmly clamped to the respective shafts by members 53 and 54 between the threaded nuts 55 secured to the outer ends of the correspondingly threaded shafts and washers 56 and a flange 57 pressing against the collars 26 and 27 and also constituting bearing plates for the inner hubs 29 and 32 respectively of the shaft carrying frames. Secured to the opposite end of each shaft are geared wheels, 60 and 61, each being keyed to their respective shafts and held in position by a pair of washers 63, 63, and 64 and 64, these washers being fitted between the gears and hubs 65, 65, and 66, 66, the latter having extending arms 67, 67, and 68, 68, respectively to provide supports and bearings for axles 71 and 70. These axles pass through a pair of intermediate plates 73, 73 and carry the geared wheels 74 and 75 which are in mesh with each other and the wheel 74 is in turn in mesh with the upper gear 60 on the shaft 34 while the other gear 75 is in mesh with the lower gear 61 on the shaft 35. By this arrangement of the intermediate plates 73 and gears 74 and 75, I am enabled to rotate the pair of parallel saws or milling cutters in unison and in the same directions of cutting rotation—thus providing for their cutting action on the pipe 1 from opposite or nearly opposite points in a uniform manner. To hold the shafts 34 and 35 and the respective gear wheels at the ends and the eccentric bearings all firmly positioned, I provide extensions 80 and 81 of the members 28 and 31, and bearings 82 and 83 for the outer ends of the shafts are provided by a bracket 85 extending from the frame 25 to which it is detachably secured,—this affords a bearing and clamping means for the outer ends of the shafts, as shown in Fig. 4. This construction provides a simple, efficient, firm, and rigid means of assembling and holding the entire mechanism, thus far described on the frame 25.

In order to rotate the shafts 34 and 35 and the cutters thereon, I provide a crank 86 and handle 87 thereon, which is attached to the extension 88 of one of the shafts, preferably the top shaft 34, the handle having a hub which is threaded thereon, as clearly shown in Figs. 1, 3, and 4. Rotation of the crank 86 thus serves to rotate simultaneously and in the same relative line of travel, where the cutters 51 and 52 act upon the work, and in balanced relation thereto, while the entire frame, cutters, etc., thus being rotated may be moved slidingly upon the bar 12. In order to take up the back lash during this rotative action and therefore also to provide a springlike or yielding tension on the shafts 34 and 35, I arrange a spring 90 to act on the shaft 34 and a spring 91 to act similarly on the shaft 35. These springs are of suitable force to hold the eccentric frames 30 and 33 with a tension and bear upon the teeth 39 of the worm 40 through the teeth 38 of the gears 36 and 37 respectively. As clearly shown in Fig. 7, these springs are preferably coiled about their respective shafts with the end portion of each spring curled around and secured to the adjacent part of the frame 30 or 33 and with the free or extended part of the spring secured to a pair of cross-bars 95, 95 by bolts 96, 96, and extending across and bearing upon the adjacent part of the sliding frame 25, thus imparting a tension from the fixed bearing on the frame 25 to the frame of the eccentric bearings in which each shaft is mounted. This arrangement prevents any springing of the cutters 51 and 52, particularly during the first portion of the cutting operation into and through the thicknesses of the work, permitting also an even uniform driving of the cutters.

Secured to the bar 12 preferably adjacent one end and carrying the hook 2, already described, is a collar 98 carrying an arm 99 on which is formed a hub 100 having a threaded interior of appropriate diameter and pitch to receive the threads 101 of the hollow sleeve 50 through which the shaft 41 passes, as previously explained. Attached to this hollow shaft 50 is a hand wheel 102, said shaft 50 extending to the frame 25 and bearing thereagainst through a collar 103 and which has a thrust bearing for the ball bearing held by the catch 104 and bearing against a raceway 105 on the frame 25. This arrangement permits an even thrust against the frame 25 during the feed action of the same as it and the cutters are moved slidingly on the bar 12, the thrust through the hub 100 allowing therefor. In order to also provide a yielding tension on the feeding shaft 50, I secure to the head of said shaft, the hub 108 which also is the hub of the hand wheel 102, said hub constituting a ball bearing raceway for a thrust collar 106 held thereagainst by the coiled expansible spring 107 between the wheel 44 on the shaft 41 and said collar 106. This arrangement takes up any looseness or back lash in the feeding of both these shafts, thus providing a firm, even, and yielding tension holding the respective shafts and gears adjacent thereto in firm position against the fixed side of the teeth or thrust in engagement at any point.

The operation of the cutter as thus far described will be readily understood and appreciated. The apparatus is intended for use in connection with the systems of my prior application, as already mentioned, and therefore is designed particularly with the view of being applicable to form outlet slots on conduits already installed in a building where the clearance about the conduit is limited. In operating the apparatus, the operator swings the same over the conduit to be slotted by the hook 2 thereupon securing the clamping jaws firmly in position by fitting the angular contact portions 5 over the pipe which thus are self-centered and firmly seated thereon, giving a 4-point bearing. Manipulation of the clamping screw 15 holds these jaws firmly in engagement and simultaneously and automatically alines and positions the entire apparatus through the bearing of the bar 12 on the semi-circular bearings 9 and 10. The operator then adjusts the eccentric bearings for the cutters 51 and 52 through manipulation of the hand wheel 44, meanwhile sliding the cutters into desired position for initiating the cutting of the slot by manipulation of the hand wheel 102. Where a predetermined length of slots for the outlet boxes is to be cut, I may apply adjustable slides 109 and 110 about the bar 12, thus limiting the sliding movement of the apparatus along said bar without other attention from the operator. The operator, while rotating the handle 87 and thus turning the cutters, may further adjust the centers of the cutting shaft toward each other by rotating the hand wheel 44 thus swinging the eccentric bearings for said shaft together until the cutters have gone entirely through the thickness of the conduit pipe being operated upon, the provision of the intermediate links 74 and 75 allowing for this adjustment on said eccentrics while simultaneously rotating the cutters. The tension of the springs 90, 91, and 107 is most important in this feeding and cutting action as this automatically imparts a uniform and yielding transmission to the cutters, both while being adjusted toward each other for depth of cutting and for continuing the cutting action, insuring a uniform, relatively smooth cut, practically eliminating the formation of burrs or rough edges on the inside of the conduit and not endangering the through current carrying wires therein. The entire apparatus being positioned substantially at one side of the conduit, necessitates only a very slight clearance on the other side of the conduit required by the thickness of the hook 2 and jaws 5 rendering same adaptable for many positions which would otherwise be difficult if not impossible of slotting and which would require entire taking down of the conduits, cutting the wire, and interrupting the current supply. As explained in my said co-pending application, it is an important feature of my system and process to thus provide outlets at any desired point without interruption to either the conduit or to the current supplied therethrough to other points and the present apparatus is intended to carry out the same.

My present invention is further described and defined in the form of claims as follows:

1. A machine of the kind described adapted for forming parallel cuts simultaneously, having a pair of milling cutters, means to rotate said cutters, and means to move said cutters toward and from each other, together with yielding means to hold the cutters under tension to prevent back lash.

2. A machine of the kind described adapted for forming parallel cuts simultaneously, having a pair of milling cutters, means to rotate said cutters, and means to move said cutters toward and from each other, together with yielding means to hold the cutters under tension during the adjustment and rotation of said cutters, said yielding means being constructed and arranged to hold said cutting tools into substantially uniform cutting operation and to eliminate back lash.

3. A machine adapted to cut a slot in a pipe comprising a pair of pipe engaging clamps, a slide located between and held by said clamps, apparatus adapted to move longitudinally of said slide and carrying cutting devices, means to move said cutting devices into operating position with a pipe and means to move the cutters while in operating position progressively to form a slot in said pipe.

4. Cutting apparatus of the kind described comprising a pair of cutting tools adapted to operate upon opposite portions of a pipe to cut slots progressively therein, in combination with clamping means to hold said cutters in alinement with said pipe, said clamp having means to secure a spaced bearing on the pipe, and automatic means allowing for operation of the cutters on pipes of different diameters.

5. Cutting apparatus of the kind described comprising a pair of cutting tools adapted to operate upon opposite portions of a pipe to cut slots progressively therein, in combination with clamping means to hold said cutters in alinement with said pipe, said clamp having means to secure a spaced bearing on the pipe, together with means permitting the cutters to slide relatively to said clamp while holding said cutters in alinement during their cutting operation.

6. A clamp to secure a cutting machine to a pipe, having clamping jaws with a spaced bearing therefor, a hinge for said jaws comprising a support for the cutters and a rotatable bearing between the clamping jaws on said support, said bearing permitting relative movement of the clamping jaws toward and from each other while holding the support in alinement with pipes of varying diameters held by said clamping jaws.

7. Cutting apparatus of the kind described comprising a pair of cutters mounted on a slide, means to rotate said cutters carried by the slide, means to adjust the cutters toward and from each other and yielding means to hold the cutters in said adjusted position whereby a substantially uniform tension from the cutters to the work is secured.

8. Cutting apparatus of the kind described consisting in a clamp to hold the apparatus on a pipe to be cut, cutters, a support carried by the clamp on which the cutters may slide, a frame slidable on said support and carrying the cutters, bearings for said cutters mounted in the frame and having the cutters supported eccentrically in said bearings, means to rotate said eccentric bearings and means to rotate the cutters simultaneously and in the same direction of cutting rotation.

9. Cutting apparatus of the kind described consisting in a clamp to hold the apparatus on a pipe to be cut, cutters, a support carried by the clamp on which the cutters may slide, a frame slidable on said support and carrying the cutters, bearings for said cutters mounted in the frame and having the cutters supported eccentrically in said bearings, means to rotate said eccentric bearings and means to rotate the cutters simultaneously and in the same direction of cutting relation, together with means to move the frame and cutters on said support and yielding devices bearing between the feeding means and the eccentric adjusting means, whereby yielding tension is applied to each and all looseness between gears, bearings, or the like is prevented.

10. A cutting apparatus adapted to be supported from and secured to a pipe, while the pipe is installed in a building comprising cutting devices and a pipe clamping member, the cutting devices being arranged at one side of the clamp engaging portion.

11. A machine adapted to cut a pair of slots on a pipe comprising pipe engaging clamps, a slide held by said clamp, apparatus adapted to move longitudinally of said slide and carrying cutting devices, means to move said cutting devices into operating position on the pipe and means to move the cutters while in operating position progressively to form a slot.

12. A machine of the kind described adapted for cutting a plurality of parallel slots in a pipe, comprising pipe clamping means and slot cutting means, said pipe clamping means being so constructed and arranged as to automatically present the slot cutting means to the work in predetermined position.

13. A machine of the class described adapted for forming parallel cuts simultaneously having, in combination, a pair of cutters rotatable in opposite directions and lying in the same plane, means for rotating the cutters and moving them longitudinally of a pipe, and means for yieldingly holding said cutters in engagement with the pipe during the cutting operation.

14. A machine of the class described adapted for forming parallel cuts simultaneously having, in combination, a pair of cutters rotatable in opposite directions and lying in the same plane, means for rotating the cutters and moving them longitudinally of a pipe, and clamping means for attaching said cutting apparatus in operative position on the pipe to be cut, located at the limits of travel of the cutters.

15. A machine of the class described adapted for forming parallel cuts simultaneously having, in combination, a pair of cutters rotatable in opposite directions and lying in the same plane, means for rotating the cutters and moving them longitudinally of a pipe, means for moving said cutters into engagement with the pipe, and means for adjusting the tension of the cutters against the pipe.

16. A machine of the class described adapted for forming parallel cuts simultaneously having, in combination, a pair of cutters, and a ratchet spring tension device for yieldingly holding the cutters to the work.

17. A machine of the class described adapted for forming parallel cuts simultaneously having, in combination, a pair of cutters, means for positioning said cutters on the work, means for setting the tension with which the cutters are applied to the work, and means for varying said tension irrespective of the size of the work.

18. A machine of the class described adapted for forming parallel cuts simultaneously having, in combination, a pair of cutters, and means for automatically limiting the longitudinal travel of the cutters on the work.

19. In a machine of the class described, the combination of a frame, a cutter mounted for longitudinal and rotary movement thereon, clamping jaws for positioning said frame on pipes of various diameters in predetermined relation with the cutter, and means for limiting the longitudinal movement of said cutter.

20. In a machine of the class described, the combination of a frame, a cutter mounted for swinging, longitudinal and rotary movement thereon, clamping jaws for positioning said frame on pipes of various diameters in predetermined relation with the cutter, and means for limiting the swinging and longitudinal movement of said cutter.

21. In a machine of the class described, the combination of a frame, a cutter mounted for longitudinal movement thereon, clamping jaws for positioning said frame on pipes of various diameters in predetermined relation with the cutter, and means for limiting the movement of the cutter.

In testimony whereof, I have signed my name to this specification, in the presence of two subscribing witnesses.

ARCHIBALD T. SAMPSON.

Witnesses:
JAMES R. HODDER,
RACHAEL L. CLARK.